United States Patent [19]
Wilkerson et al.

[11] Patent Number: 5,796,471
[45] Date of Patent: Aug. 18, 1998

[54] LIDAR ATMOSPHERIC WIND DETECTOR

[75] Inventors: Thomas D. Wilkerson, Hyde Park, Utah; Jack A. McKay, Washington, D.C.

[73] Assignee: Utah State University, Logan, Utah

[21] Appl. No.: 718,150

[22] Filed: Sep. 18, 1996

Related U.S. Application Data

[60] Provisional application No. 60/003,919, Sep. 18, 1995.
[51] Int. Cl.$^6$ .................................................. G01P 3/36
[52] U.S. Cl. .................................................. 356/28.5
[58] Field of Search ...................... 359/17, 18; 356/4.01, 356/4.02, 4.03, 4.04, 4.05, 5.01, 5.03, 5.05, 27, 28, 28.5, 337, 338, 342, 345, 347, 372, 376; 364/550, 560, 561; 73/170.16, 170.01, 170.06, 170.07, 170.08, 170.11

[56] References Cited

U.S. PATENT DOCUMENTS

5,255,065 10/1993 Schwemmer ........................... 356/4.01

*Primary Examiner*—William L. Oen
*Attorney, Agent, or Firm*—Thorpe, North & Western, LLP

[57] ABSTRACT

The present invention is a lidar for detecting characteristics of the atmosphere, and in particular for detecting the speed and direction of objects such as air-borne particles and molecules in the atmosphere in order to determine the speed and direction of wind which is carrying them. The lidar comprises at least one lasing transmitter which transmits at least one lasing beam of radiation in the frequency range of ultraviolet light and which is swept along a path in the atmosphere so as to strike objects in the atmosphere causing backscatter radiation which is received by a receiver for determination of the Doppler shift of the objects being struck. The lidar is moved in a vehicle such as a satellite, so that wind speeds and directions at a number of altitudes and over a large area can be measured.

25 Claims, 5 Drawing Sheets

LIDAR ATMOSPHERIC WIND DETECTOR

BACKGROUND OF THE INVENTION

This application claims the benefit of U.S. Provisional application Ser. No. 60/003,919, filed Sep. 18, 1995 entitled LIDAR ATMOSPHERIC WIND DETECTOR.

1. The Field of the Invention

The present invention pertains generally to the field of lidar. More particularly, it pertains to a lidar having a laser transmitter and receiver capable of measuring wind characteristics, and specifically wind speed and direction, at numerous and various points around the globe of the earth.

2. The Background Art

As the frontiers of science advance, new and innovative applications are found for developing technologies. Laser technology is no exception. There are ever-increasing numbers of discoveries of applications for lasers and electromagnetic radiation to solve problems and learn more about our world. For purposes of convenience, the term "light" will be used to mean radiation of all frequencies and wavelengths. Lasers often lend themselves to new and ingenious uses because of the high degree of predictability and reliability of lasers, which is in part due to the stability of the wave-lengths and relatively narrow frequencies of the coherent light they emit. It has been found that lasers often provide the precision and accuracy desired within the fields of science and medicine. The need for such precision and accuracy exists with regard to the study and analysis of wind speed and direction in the troposphere. Wind speed and direction are important to a number of disciplines, including scientific fields such as meteorology and atmospheric research as well as applied fields such as military and commercial travel. In these disciplines it would be useful to have information regarding atmospheric wind speeds and directions, particularly at numerous and various points. However, it has often proven difficult to accurately, precisely and efficiently make such measurements.

There has emerged an idea of using laser light to measure atmospheric wind speeds and direction, but it has been a concept in search of practical large-scale implementation. Lidar is an apparatus, similar in operation to radars, but having a transmitter which emits laser light instead of microwaves; lidar emits a laser beam which impinges upon an object and is backscattered, the backscattered light then enters into a receiver and is analyzed. Lidars have provided hope for a viable approach to the measurement of atmospheric wind speeds and directions because the backscattered light can provide information about the characteristic attributes of the object, such as distance, direction, or speed, may be determined. The speed of the object is determined from what is known as the Doppler shift in the frequency of backscattered light; that is, the speed of an object is determined from comparing the frequency of the light before and after it is backscattered, where the shift in the frequency of the light is a function of the speed of the object relative to the line of sight of the impinging light. The direction of an object is determined from what is known as vector analysis; that is, the direction of an object is determined from comparing the velocity (or magnitude of the direction of movement) of an object from at least one point of reference, where at least two measurements of the object's speed provides a resultant measurement of direction.

Generally, lidar are used from a stationary source to provide information regarding fairly massive objects, such as in law enforcement where a stationary laser light source is used to determine speeds of automobiles. Lidar use has been limited by a number of factors, notably including the difficulty in: adjusting for movement of the laser light source, heat dissipation, and difficulty inherent in making measurements of small objects at great distances. Typically wind speed and direction are measured relative to the ground, so the ground is the frame of reference of interest. Movement of the laser light source relative to the frame of reference of interest, so far as it is in the direction of the line of sight of the laser, causes Doppler shifts which are not due to the movement of the object. It has proven difficult to make the required corrections to compensate for the movement of the laser.

Other areas of difficulty which exist in the art include the dissipation of heat where the medium of the laser or the receivers build thermal energy during operation. There are difficulties in building and using safe lasers, as many are of a frequency or intensity which can cause damage to the eyes when observed or to skin and other tissues when radiated. Another problem in the art has been gathering information regarding small objects at great distances. It has proven difficult to produce lasers of a sufficiently narrow and clearly defined frequency so as be able to clearly observe and evaluate frequency shifts in the backscattered light.

It would therefore be an advantage to have a laser that could be adjusted to compensate for movement, so that the Doppler shift of interest could be directly measured without adjusting the receiver. It would be an added advantage to reduce the need to cool the receiver to reduce thermally induced noise, as well as reducing the need to cool the laser. Another advantage would be to use laser light of a frequency and intensity which would not damage eyes, skin or tissues of life forms; and a further advantage if such laser light had a sufficiently defined and narrow frequency that small objects, such as molecules and air-borne particles, could be measured at substantial distances.

Basic methods of wind speed and direction measurement include the use of balloons and wind vanes. Balloons may be used to approximate general wind speeds and directions based on their drift rates. The rate with which a wind vane rotates also indicates wind speed and the direction the vane points indicates wind direction. Both of these methods are limited in that they only provide approximate wind speeds and directions for limited areas. The balloon only provides information regarding wind speeds and directions for that area over which it drifts and a vane for the location where it is fixed. Another limitation of the balloon and wind vane methods is the inability to gather information regarding wind speeds and directions at remote locations, particularly over the oceans where there are great expanses of water.

It is well known that the earth's atmosphere is very complex and that wind speeds and directions may vary significantly at different altitudes within the same area, as well as varying from one area to the next. It would be an advantage to measure wind speeds and directions at a variety of altitudes, at numerous locations over a large area, and at remote locations which are difficult to reach. It would be a further advantage to make such measurements over a short period of time, in order to have a global understanding of the interrelationships of atmospheric conditions within limited windows of time.

A modern tool for gathering and distributing information on a global scale is the satellite. Satellites are even used to monitor atmospheric conditions such as weather systems and storm locations; photographic images are routinely reproduced. However, a limitation to gathering information by satellite arises when the selected point of interest or target of the satellite changes. One way to adjust a satellite for a change in the point of interest is to change the orientation of the satellite, to point the satellite in a new direction so that its sensors, telescopes and other measuring devices point in the proper direction. Such changes present serious concerns because the gyroscopic stability of the satellite must be realigned, and if not done properly, the satellite will collapse.

In some instances mirrors may be used to adjust for variations in the point of interest. Mirrors may be used to change the focus of the satellite's instruments to a particular point, or through rotation of the mirror numbers of points may be scanned. The rotation or continuous adjustment of mirrors can cause instruments to focus attention on various points of interest below the satellite from which desired information may be gathered. While rotation or adjustment of mirrors to accomplish nadir-viewing from satellites is the most advantageous of the above approaches to gathering information regarding a number of points of interest below the path of the satellite, there are limitations.

One significant limitation to the use of mirrors to accomplish continuous nadir-viewing adjustments arises from the sheer size and mass of the mirror itself. Generally, the resolution of an image improves as mirror size increases. High resolution mirrors are consequently rather large. Furthermore, there are serious problems to overcome in manufacturing such large mirrors. There are material limitations because large glass mirrors may crack or shatter and are awkward and cumbersome to handle. There are also production limitations in achieving mirrors within necessary tolerances of curvature and reflection.

High resolution mirrors are further limited by their mass in deployment. Not only does the mass of a large mirror add to the payload of the satellite when it is launched, but a substantial mass means the mirror has a large moment of inertia when it begins to turn, and consequently develops a large angular momentum when it is turning. Further limitations arise due to the motors and mechanical components required for operation of the mirrors. Not only are there technical challenges in producing movable mirrors with minimal mechanical vibration, Newtonian mechanics requires the satellite to include systems such as momentum wheels or gyroscopic stabilizers to compensate for the movement of the mirrors; thus, massive mirrors require and consume large amounts of fuel. Additionally, it is difficult to adjust, replace or repair a large mirror after satellite deployment if flaws are discovered or develop. Therefore, there are substantial costs and economic burdens associated with use of movable mirrors on satellites.

It would be an advantage to measure wind speed and direction at numerous and various points around the globe of the earth using a satellite. It would be an advantage to make the measurements in as efficient and cost effective way as possible. It would be a further advantage to accomplish continuous nadir-viewing adjustments or sweeps with a minimal moment of inertia and angular momentum; thus, requiring an apparatus or method involving components which are of minimal mass, small and mechanically simple. Furthermore, it would be an advantage if the device or method used components which are relatively inexpensive to maintain, requiring little or no repair.

OBJECTS AND SUMMARY OF THE INVENTION

It is therefore an object of the present invention to provide a lidar which measures wind speed and direction in a gas atmosphere, particularly that of the atmosphere of the earth.

It is another object of the invention to provide such a lidar which can measure wind speed and direction at numerous and various points around the globe of the earth.

It is another object of the invention to provide such a lidar having tunable light frequency.

It is another object of the invention to provide a lidar which may be used in a moving vehicle.

It is another object of the invention to provide such a lidar which uses light which is not dangerous to skin, eyes or other tissues.

It is another object of the invention to provide a lidar light frequency in the ultraviolet range of the spectrum.

It is another object of the invention to provide a lidar that requires substantially less cooling during operation.

It is another object of the invention to provide such a lidar operable with a minimal angular moment of inertia and angular momentum.

It is another object of the invention to provide such a lidar which is of minimal mass, small and mechanically simple.

It is another object of the invention to provide such a lidar which will be simple and inexpensive to maintain, requiring little or no repair.

It will be apparent to those skilled in the art that the disclosed invention is applicable to gather information regarding the flow or dynamics of fluids or gasses, including information about speed, velocity, direction and momentum.

The present invention is a lidar for detecting characteristics of the atmosphere, and in particular for detecting the speed and direction of objects such as air-borne particles and molecules in the atmosphere in order to determine the speed and direction of wind which is carrying them. The lidar comprises at least one lasing transmitter which transmits at least one lasing beam of radiation in the frequency range of ultraviolet light and which is swept along a path in the atmosphere so as to strike objects in the atmosphere causing backscatter radiation which is received by a receiver for determination of the Doppler shift of the objects being struck. The lidar is moved in a vehicle such as a satellite, so that wind speeds and directions at a number of altitudes and over a large area can be measured.

These and other objects, features, advantages and alternative aspects of the present invention will become apparent to those skilled in the art from a consideration of the following detailed description taken in combination with the accompanying drawings.

The preferred embodiment of the present invention, as will be discussed henceforth, is a satellite-based application of lidar technology. While most elements of the present invention are known to those skilled in the respective arts, the present invention takes advantage of particular properties of lasers which are particularly prevalent in a laser known as an Alexandrite ring laser. Specifically, the advantageous ability of an Alexandrite ring laser to be tuned to transmit a beam having a desired frequency with a high degree of precision is combined with a holographic optical element (HOE) which causes the laser beam to sweep over the desired area of interest. The HOE enables the satellite-based lidar to conserve precious fuel and energy because of the relatively small amount of inertia created by the HOE for which the satellite must compensate. This is in stark contrast to the mirror-based scanning devices of the prior art which create significant amounts of inertia. Furthermore, by using the Alexandrite ring laser, the precision of the lidar is significantly improved because of the narrow band width and large frequency range over which the laser can be tuned to operate.

BRIEF DESCRIPTION OF THE DRAWINGS

Reference will now be made to the figures in which the various elements of the present invention will be given numerical designation and in which the invention will be discussed so as to enable one skilled in the art to make and practice the invention.

The above and other objects, features and advantages of the invention will become apparent from a consideration of the subsequent detailed description presented in connection with the accompanying drawings in which.

DETAILED DESCRIPTION

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the illustrated device, and any additional applications of the principles of the invention as illustrated herein, which would normally occur to one skilled in the relevant art and possessed of this disclosure, are to be considered within the scope of the invention claimed.

Figure 1:
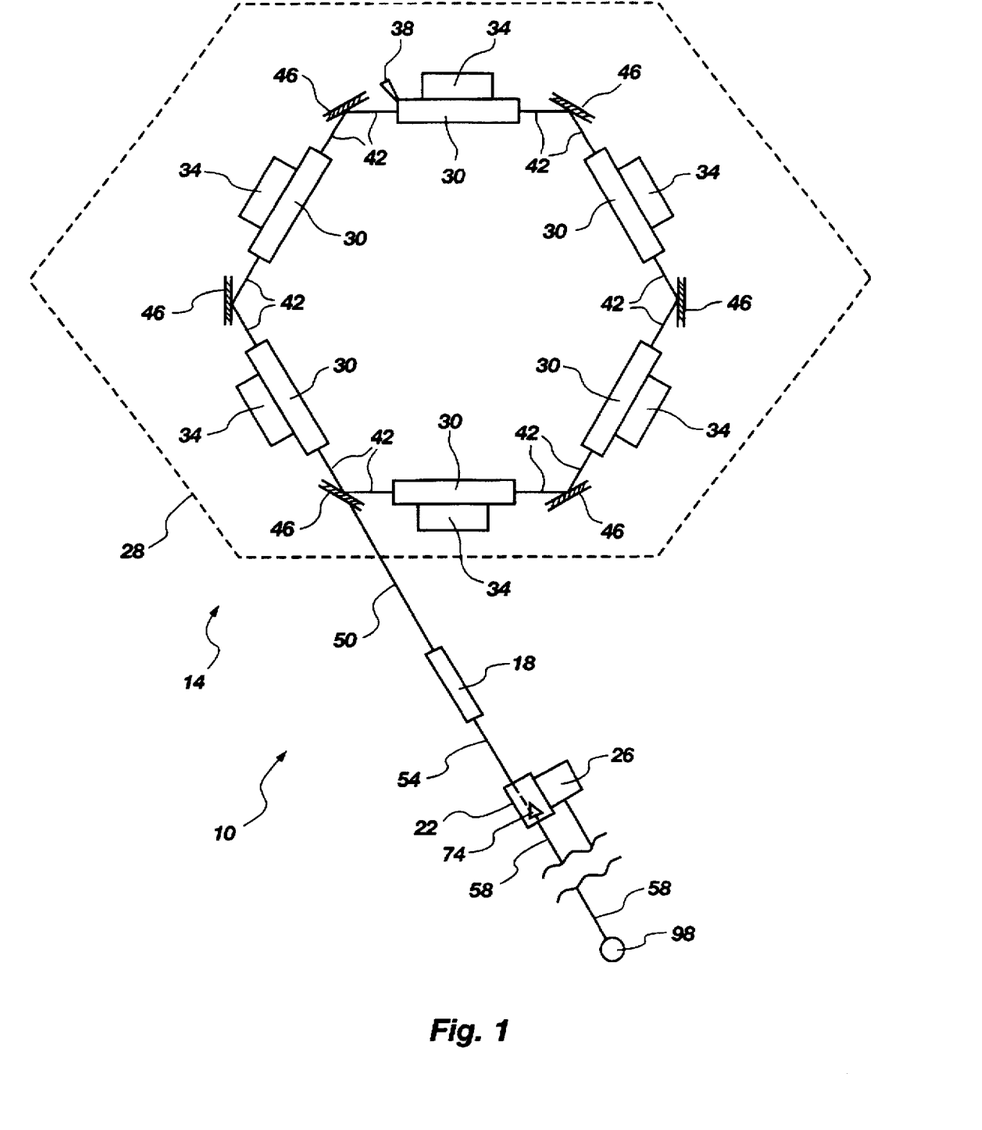
FIG. 1 is a schematic view of the lidar made in accordance with the principles of the present invention.

Referring to FIG. 1, there is shown a lidar, generally designated at 10. The lidar comprises a transmitter generally designated at 14, a wave chamber 18, a beam scanner 22, and a backscatter light receiver 26.

In the preferred embodiment the transmitter 14 comprises at least one stabilized Alexandrite ring laser 28, which is schematically represented in a general way in FIG. 1. One familiar with the art will recognize the invention may be practiced using one or more lasers. The transmitter 14 comprises a number of Alexandrite rods 30, although any medium suitable for light amplification by stimulated emission of radiation may be used. Alexandrite, a naturally occurring gem stone which can be synthetically reproduced, is a desirable medium. In addition to its other advantageous properties, Alexandrite operates in the near-infrared region of the spectrum, having a wavelength between approximately 720–800 nanometers (nm). In the preferred embodiment the Alexandrite rods 30 are arranged in a ring or racetrack configuration. It should be understood that while the ring configuration is preferred, a linear arrangement may also be used. It should be further understood that any number of rods 30 may be used; for example, transmitter consisting of only a signal rod 30 in a linear configuration may prove to be adequate.

The rods 30 are "pumped" using pumping laser diodes, schematically represented at 34. For laser action, or "lasing", to occur a intermediate energy state must be achieved in rods 30. That is, energy must be introduced into the rods 30 which will excite the electrons of the atoms or ions in the laser material from the ground energy state into a higher state which rapidly decays to a intermediate energy state; because this energy state is of higher energy than the ground state, there exists a non-equilibrium state of electrons having a relatively long mean life against decay by the spontaneous release of energy. This is a description of the basics of laser operation, as those skilled in the art are aware. The process of exciting electrons into the higher energy state in order to reach intermediate states is called "pumping", and is most commonly accomplished by producing very short and intense bursts of light in the medium. When lasers were first developed, the excited energy state was achieved using flash tubes which were placed adjacent to the laser medium and which produced very short and intense bursts of broad band (incoherent) light. While flash tubes could be used in the present invention, diodes are preferable because they are smaller, lighter, less frangible, easier to move, and moreover provide greater efficiency because narrower bands requiring lower energy input may be selected. Pumping of Alexandrite with 680 nm laser diodes has been demonstrated, with a slope efficiency of twenty-five percent (25%).

When the electrons spontaneously return from the intermediate state to the lower state there is the release of energy in the form of photon emissions or light. In this intermediate state, the introduction of a photon having the right energy can trigger an avalanche of stimulated emission events. In the present invention stimulated emission of radiation is triggered by an external source of photons, an injection diode 38, which introduces desired photons into at least one of the rods 30, causing an avalanche of like photons having the desired energy, direction, phase and state of polarization. The use of the injection diode 38 in inducing the avalanche of photons is a process known as "seeding." The result is a coherent (no phase shift over time) stream of photons emitted from the lasing medium 30, shown as the lasing beam 42.

Mirrors 46 (or prisms, if desired) direct the lasing beam 42 between the rods 30 to facilitate the lasing process of the ring configuration. The mirrors 46 (or prisms, if desired) are constructed and placed so that the lasing beam 42 is reflected therefrom. One or more of the mirror (or prism) surfaces will allow a small amount of the lasing beam 42 to pass through substantially unreflected, which is the transmitted beam 50. In the preferred embodiment, the transmitted beam 50 of the Alexandrite ring laser 28 emerges in the near-infrared and is passed into a non-linear optical device 18 where it undergoes frequency doubling. While in the preferred embodiment the non-linear optical device provides for frequency-doubling, those skilled in the art will recognize that there are a number of ways to produce nonlinear optical devices having properties such that the transmitted beam 50 could undergo not only frequency-doubling, but frequency-tripling. In the preferred embodiment, the frequency-doubled beam 54 operates in the ultraviolet range. The frequency-doubled beam 54 enters the scanner 22 which sweeps the beam as desired, here denoted as the scanning beam 58.

Figure 2:
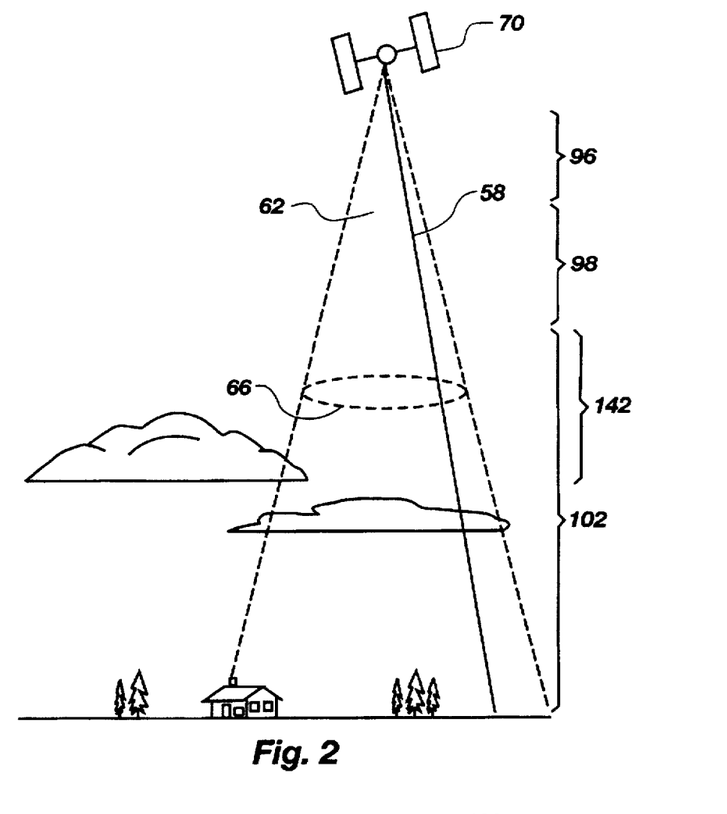
FIG. 2 is a diagram of one method of use of the lidar of FIG. 1 in a moving vehicle.

In the preferred embodiment shown in FIG. 2, the sweep of the scanning beam 58 defines a conical region 62, having a circular or elliptic footprint 66 relative to the scanner 22 (see FIG. 1). In the preferred embodiment the lidar 10 is used in a satellite 70 (see FIGS. 2–3). However, the use of the lidar 10 is not limited to satellites, and a variety of air vehicles (i.e. airplanes, jets, balloons, gliders, etc.) and earth-based vehicles (i.e. ships, emerged submarines, floating buoys, automobiles, rail vehicles, etc.) could be employed. The lidar could even be operated from a fixed position (i.e. buildings, control towers, etc.).

The scanner 22 is referred to herein as a "laser source." even though the beam 58 originates from the seeding diode 38. The scanning beam 58 is thus projected by the scanner 22 laser source, and some appropriate portion of the scanner 22 is rotated appropriately, preferably in a conical sweep about a conical path with respect to the satellite 70 to thereby cause a conical sweep of the scanning beam 58. In some applications, a particular scanner may be simply rotated in plane, and thus not about a conical path, while still causing a conical sweep of the scanning beam, this being effectuated by optical properties of the particular scanner, as suggested below in reference to Holographic Optical Elements.

Scanners are generally constructed of a rotating mirror having one of a number of shapes which include flat, concave or polygon structures, spinning on an axis. When the laser beam strikes the mirror the beam is reflected at an angle in accordance with the general rule that the angle of incidence equals the angle of reflection. There are also resonant and galvanometer scanners which twist a mirror back an forth over limited angular ranges in order to sweep the laser beam along a desired path. A scanner may sweep the beam back and forth or in a number of other patterns depending upon the number of mirrors and the manner in which they are moved to reflect the beam.

In one embodiment of the present invention the sweep of the scanning beam 58 is caused by passing the frequency-doubled beam 54 through a spinning prism 74, shown in FIG. 1, which deflects the scanning beam 58 as desired. In the preferred embodiment of the present invention the frequency-doubled beam 54 passes through a rotating holographic optical element (HOE) 78, shown in FIGS. 5–6, rather than a prism 74 (if the power is low enough, the HOE 78 can be used for both transmitting the laser beam and appropriately adjusting the line of the receiver telescope). The HOE 78 is a thin sheet of material capable of receiving a holographic image. In the preferred embodiment, the HOE 74 is circular in shape, having a radius 80 defined from its center axis 84 to its edge 85, and further having a transparent plate 82 of sufficient size to support the HOE 78 while permitting unimpeded passage of scanning beam 58. The HOE 74 and the transparent plate 82 have minimal mass, and the HOE 74 may be only tenths of an inch thick. HOEs are not known to be used by those skilled in the art of lidar.

The HOE 78 rotates about its center axis 84, similar to the rotation of a phonograph on a turntable, as indicated by the rotation arrow 86 (and it should be noted that the direction of rotation is immaterial, whether it be clockwise or counterclockwise). The rotation of the HOE 78 causes the sweep of the scanning beam 58 along a path which defines the conical region 62 described by the angle φ, such that the scanning beam 58 is caused by the optical properties of the HOE to be transmitted along a conical movement path; the movement of the scanning beam 58 thus described is indicated by the path arrow 90, shown in FIG. 5. As such, the concept of a conically sweeping laser beam 58 may be described in terms of a conically sweeping laser source which produces the conical sweep in the beam, or simply in terms of a conically sweeping beam regardless of what kind or type of laser source motion is used to accomplish the conical beam sweep.

Figure 5:
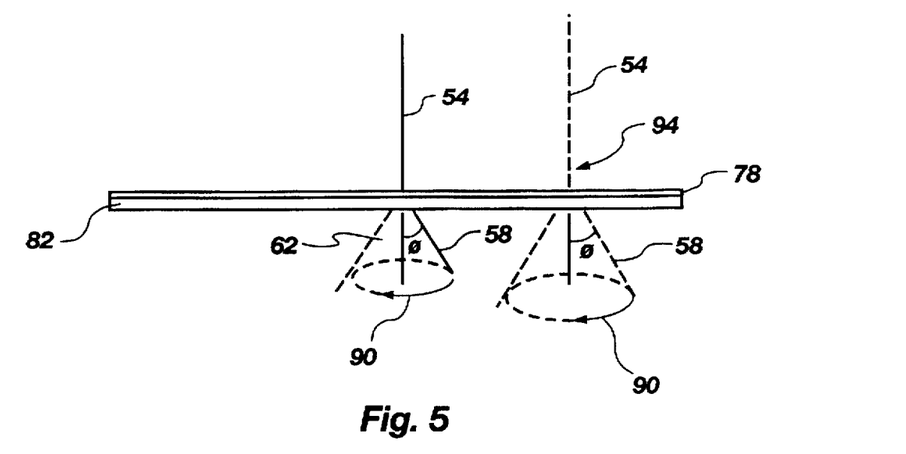
FIG. 5 is a side view of hologram used to generate sweep of the laser light of the lidar of FIG. 1.
Figure 6:
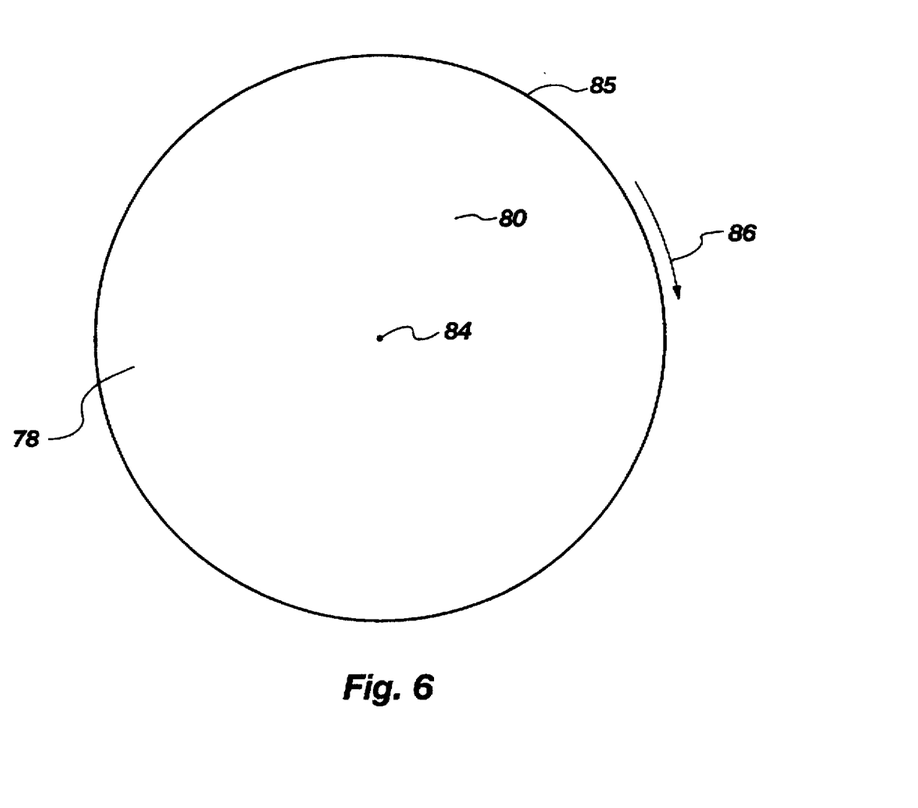
FIG. 6 is a top view of the hologram of FIG. 5.

It should be noted that the HOE 78 produces a substantially identical conical region regardless of where the frequency-doubled beam 54 strikes along the radius 80 of the HOE 78, as generally indicated by the ghost-lines 94. It should also be noted that the HOE 78 and the transparent plate 82 have a small moment of inertia and consequently a small angular momentum, requiring small amounts of energy for stable rotation.

Figure 3:
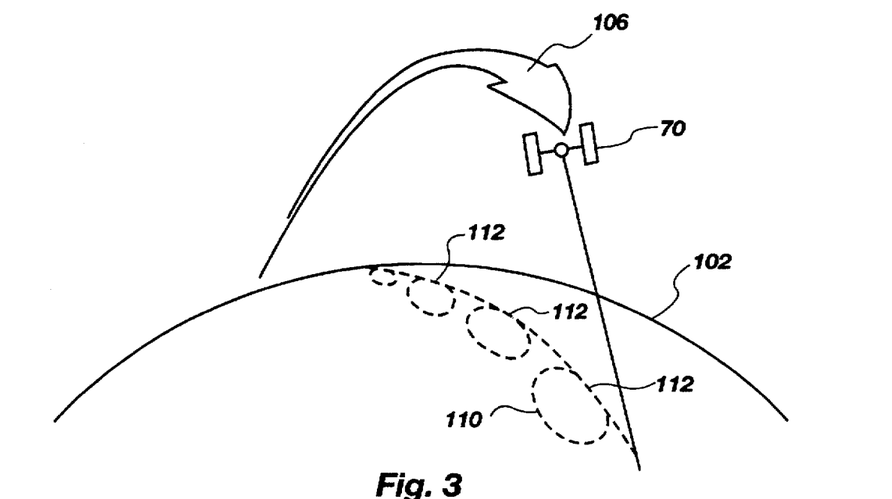
FIG. 3 is a diagram showing one sweep pattern of the lidar of FIGS. 1 and 2.

As shown in brackets in FIG. 2, the atmosphere may be basically broken into three regions, the mesosphere 96, the stratosphere 98 and the troposphere 102. In the preferred embodiment the satellite is above the mesosphere 96 with the scanning beam 58 sweeping through the troposphere 102. As indicated in FIG. 3, the satellite moves along an orbital path 106; thus, the scanning beam 58 produces a cycloid path 110 in the troposphere 102. The cycloid path 110 has at least one cross-over point 112, through which the scanning beam 58 passes at least twice.

Figure 4:
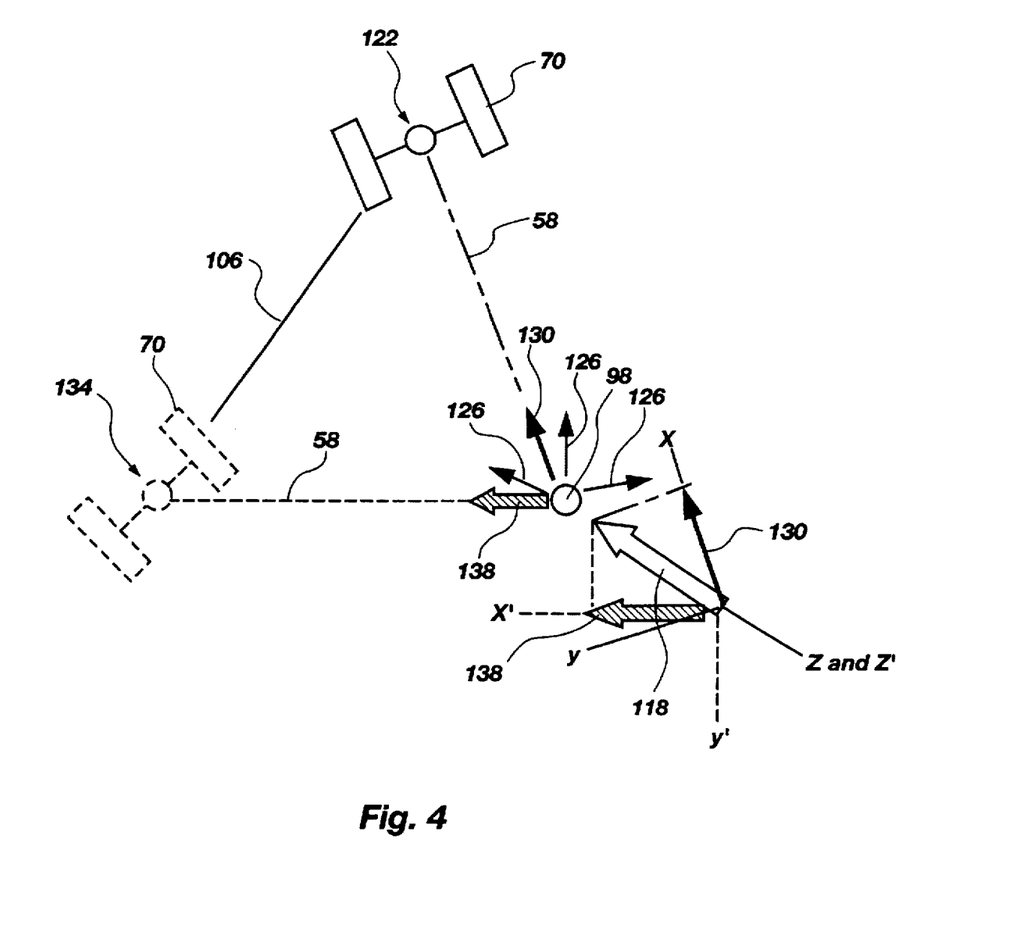
FIG. 4 is a diagram showing the use of the lidar of FIG. 1 in the moving vehicle of FIG. 2 to determine velocity of objects.

During the sweep through the cross-over point 112, the scanning beam 58 will strike an object 98, which may be either an air-born particle or a molecule, as shown in FIGS. 1 and 4. While the scanning beam 58 may not strike the same object 98 in the cross-over point 112, with a sufficiently fast sweep it is proper to presume all particles of substantially identical size and mass will have a substantially identical particle velocity vector 118, as seen in FIG. 4 (where the particle velocity vector 118 represents that of the object 98).

FIG. 4 represents an object 98 at the cross-over point 112. FIG. 4 shows the satellite 70 in an initial measurement position generally indicated at 122 and a second measurement position generally indicated at 134. The difference between the position 122 and 134 arises from the distance traveled by the satellite 70 from the time the scanning beam 58 initially passes over the crossover point 112 and the second time it passes over the crossover point 112. FIG. 4 further shows the object 98 and indicates the velocity and direction of the object with the vector 118. x- and y- and z-axes are shown, with the x-axis aligning with the scanning beam 58 from the satellite 70 in the first measurement position 122. The x-axis component of the vector 118 is indicated on the x-axis as the vector 130. x'- and y'- and z'-axes, are shown, with the x'-axis aligning with the scanning beam 58 from the satellite 70 in the second measurement position 134. The x'-axis component of the vector 118 is indicated on the x'-axis as the vector 138.

From an initial measurement position 122, the scanning beam 58 will strike the object 98, causing light to scatter in a number of directions, indicated by the scatter arrows 126. Some of the light will backscatter at a 180° angle to the scanning beam 58, along the x-axis. The first backscatter of light, not shown, travels back to the satellite (or other vehicle) and is received into the receiver 26, where a shift in the frequency of the first backscatter of light relative to the frequency of the light of scanning beam 58 is detected. This shift in frequency, known as a Doppler shift, indicates the speed of the object 98 relative to the line of sight of the scanning beam 58 and shown on the x-axis of the vector diagram in FIG. 4, and the x-axis speed of the object 98 is indicated by the magnitude of the vector 130.

The actual speed of the object 98 cannot usually be determined by this single measurement alone. Thus, a second measurement is taken a short time later, when the satellite has traveled along its orbital path 106 to a second measurement position generally indicated as 134. At the second measurement position 134 the scanning beam 58, indicated by the ghost-line from the second measurement position 134, will strike the object 98, and there will be a second backscatter of light at a 180° angle to the scanning beam 58. This second backscatter of light, not shown, travels back to the satellite and is received into the receiver 26, where again a Doppler shift is detected relative to the line of sight shown as the x'-axis of the vector diagram in FIG. 4, and the x'-axis speed of the object 98 is indicated by the magnitude of the vector 138. From the Doppler shifts in the first and second backscatters of light, and thereby knowing the magnitudes of the vectors 130 and 138, one skilled in the art can determine the speed of the object 98 at the crossover point 112. Furthermore, if one knows the first and second positions 122 and 134, and the respective angle of orientation for the scanning beam 58, one skilled in the art can determine the direction of movement of the object 98.

Where the object 98 is an air-borne particle the backscatter signal is an aerosol backscatter signal. Where the object 98 is a molecule, the backscatter signal is a Rayleigh backscatter signal. Rayleigh backscatter measurements may have advantageous intrinsic precision in the free troposphere 142 between 5 and 7 kilometers altitude, shown in FIG. 2, in daylight as well as in darkness, as the Rayleigh backscatter can exceed the aerosol backscatter signal by three orders of magnitude. Using a lidar operating in the ultraviolet, backscatter measurements may be made using aerosol, Rayleigh, or a synthesis of the two signals. Regardless of the nature of the signal measured, the object 98 is being carried by wind. Thus, a measurement of the speed of the object 98 is essentially a measurement of the speed of the wind at the altitude of the crossover point 112, and the direction of movement of the object 98 is a measurement of the wind direction.

It will be understood by those skilled in the art that although the specification discusses determining the speed and direction of an object 98 along the cycloid path 110 (FIG. 3) at a single crossover point 112 which has a given altitude, similarly there are additional crossover points at differing altitudes. Unlike ordinary optical systems, lidar provide an unlimited depth of sharp focus. Thus, the wind speed and direction can be accurately and precisely determined at differing altitudes. A 20 Watt transmitter 14, at an altitude of 350 kilometers, using a receiver 26 having a 1 meter diameter aperture telescope, may yield speed measurements having a precision of better than ±3 meters per second throughout the troposphere.

The movement of the satellite 70 along the trajectory of an orbital path 106 disadvantageously produces Doppler shifts in the backscattered light addition to the Doppler shift due to the movement of the object 98. An adjustment may be made either to the lidar transmitter 14 or receiver 26, to compensate for the Doppler shift due to the movement of the satellite 70, in order to provide for an accurate measurement of the speed direction of the object 98. A further tuning adjustment must be incorporated in the lidar of the present invention in order to compensate for the direction of the sweep of the scanning beam 58 (FIG. 2) as it pans through the cycloid path 110.

In the preferred embodiment of the present invention the desired adjustments to compensate for the Doppler shift due to the movement of the satellite 70 are made to the transmitter 14 through tuning the frequency of the lasing beam 42 (FIG. 1). Here, 'tuning" is used to mean selectively varying the frequency of the lasing beam 42. While many lasing media may be tuned to some slight degree, in the present invention it has been found that the Alexandrite is an advantageous medium because it may be tuned over a broad number of frequencies, has a narrow frequency band width, and high spectral purity. The tunability of Alexandrite has been appreciated in the medical industry, and used in making tools for cutting, cleaning and drilling. Tunability of lasers has been considered and attempted for atmospheric purposes, although generally without substantial success. Moreover, tunable lasers are not known to have been used to measure wind characteristics such as speed and direction. Thus, any lasing medium having the desired characteristics described above may be used. However, Alexandrite is the medium of the preferred embodiment; it being a medium selected from the group consisting of Alexandrite, Titanium Sapphire, Neodymium YAG, Chromium-LiSAF, Ruby, Carbon-dioxide, Hydrogen-fluoride and the semiconductor families GaInP, GaAlAs and InGaAsP.

The Alexandrite is tuned using a temperature/current-tunable laser diode which enables it to be precisely and efficiently tuned electronically for use as the injection diode 38, shown in FIG. 1. The injection diode 38 is used to lock down the frequency of the lasing in the Alexandrite, as the injection diode 38 introduces photons into at least one of the rods 30, causing an avalanche of like photons in the Alexandrite having the desired energy, direction, phase and state of polarization. As pumping of the Alexandrite by the pumping diodes 34 continues, selectively varying the frequency of the photons introduced by the injection diode 38 in turn selectively varies the frequency of the lasing beam 42 and hence the frequency of the transmitted beam 50, frequency-doubled beam 54, and scanning beam 58.

Part of the uniqueness of the present invention lies in the concept that the injection diode 38 is used as a tuner. Instead of calculating the Doppler shift and correcting for the movement of the satellite 70 and the conical sweep of the scanning beam 58, the injection diode 38 is continuously tuned to varying frequencies based upon the known quantities of the movement speed of the satellite 70 and the conical movement and angle of the sweeping beam 58, to produce a frequency in the beam 58 which causes backscattered light to exhibit a Doppler shift which is equivalent to Doppler shifting which would have occurred in the absence of movement of the airborne vehicle and conical sweeping of the laser beams 58.

It is to be understood that the non-linear optical device 18 is preferred but optional. It may be eliminated if desired, since the raw, tunable light 50 originally emitted from the laser has several other applications, including determination of vapor content.

The present invention represents a significant advance over the prior apparatus, methods and art of atmospheric wind speed and direction measurement. It is noted that many of the advantages of the present invention are a result of the combination of a tunable lasing medium, particularly that of Alexandrite with lidar technology; and additionally, the use of lidar in a vehicle. Further advantage accrues due to using a holographic optical element in the scanner 22 to deflect the laser light of the scanning beam 58.

An advantage of one aspect of the present invention is the ability to measure wind speeds and directions at a variety of altitudes, at numerous locations over a large area; and the further advantage of the ability to measure wind speeds and directions at remote locations which are difficult to reach without the expenses associated with travel and information gathering in remote locations. The relatively fast sweep of the scanning beam 58 has the advantage of making it possible to make the desired measurements over short time periods providing information regarding the interrelationships of atmospheric conditions over a large area within narrow windows of time. Thus, the present invention provides at least a two dimensional substantially contemporaneous understanding of wind speeds and directions.

It is a significant improvement over the prior art that the lidar of the present invention has a transmitter 14 wherein the frequency of the laser light source is adjusted to compensate for the speed and direction of movement of the laser as it travels above the earth. In the present invention adjustment is made to the light source so that the Doppler shift of interest is directly measured without adjusting the detection system. By contrast, in the prior art it has proven problematical to make the necessary adjustments to the detection system.

Several other advantages of the present invention may not be readily apparent from the above specification. For example, one advantage arises because receivers detecting light in the ultraviolet region of the spectrum require substantially less cooling (than for visible or infrared light) to reduce thermally induced noise to detect desired signals. The lidar of the present invention operates in the ultraviolet, therefore substantially reducing, if not altogether eliminating, the need to cool the receiver to very low temperatures to avoid undesirable thermally induced noise. Another advantage to the use of ultraviolet laser light is that the frequency range is less likely to be harmful to the eyes, skin or tissues of life forms. The ultraviolet laser light is less harmful to the eyes because it is not in the visible range of the spectrum. The advantageous properties of Alexandrite are that, in addition to being tunable, it produces light having a narrow band width, high spectral purity, and excellent frequency stability because of the properties inherent to the crystal lattice structure of this medium, thereby making it possible to measure the speeds and directions of small objects, such as molecules and air-borne particles, at substantial distances. These properties are essential for producing an acceptable likar return signal, in that this signal should be as spectrally narrow as possible in order that it can be accurately analyzed for the Doppler frequency shift, and it should be as stable in frequency as possible to avoid frequency drifts that would require repeated monitoring to correctly determine the Doppler shift. By laser will reproducably follow the set frequency of the controlling diode injection laser 38.

Another advantage of an aspect of the present invention is that of continuous nadir-viewing adjustments or sweeps with a minimal moment of inertia and angular momentum which are possible using the prism 74 and more particularly the HOE 78. Furthermore the HOE is small and mechanically simple as compared with the mirrored systems of the prior art and uses components which would be easy to check for defects, would be easy to replace and maintain, and would be comparatively inexpensive to make when compared with the mirrored systems.

Figure 7:
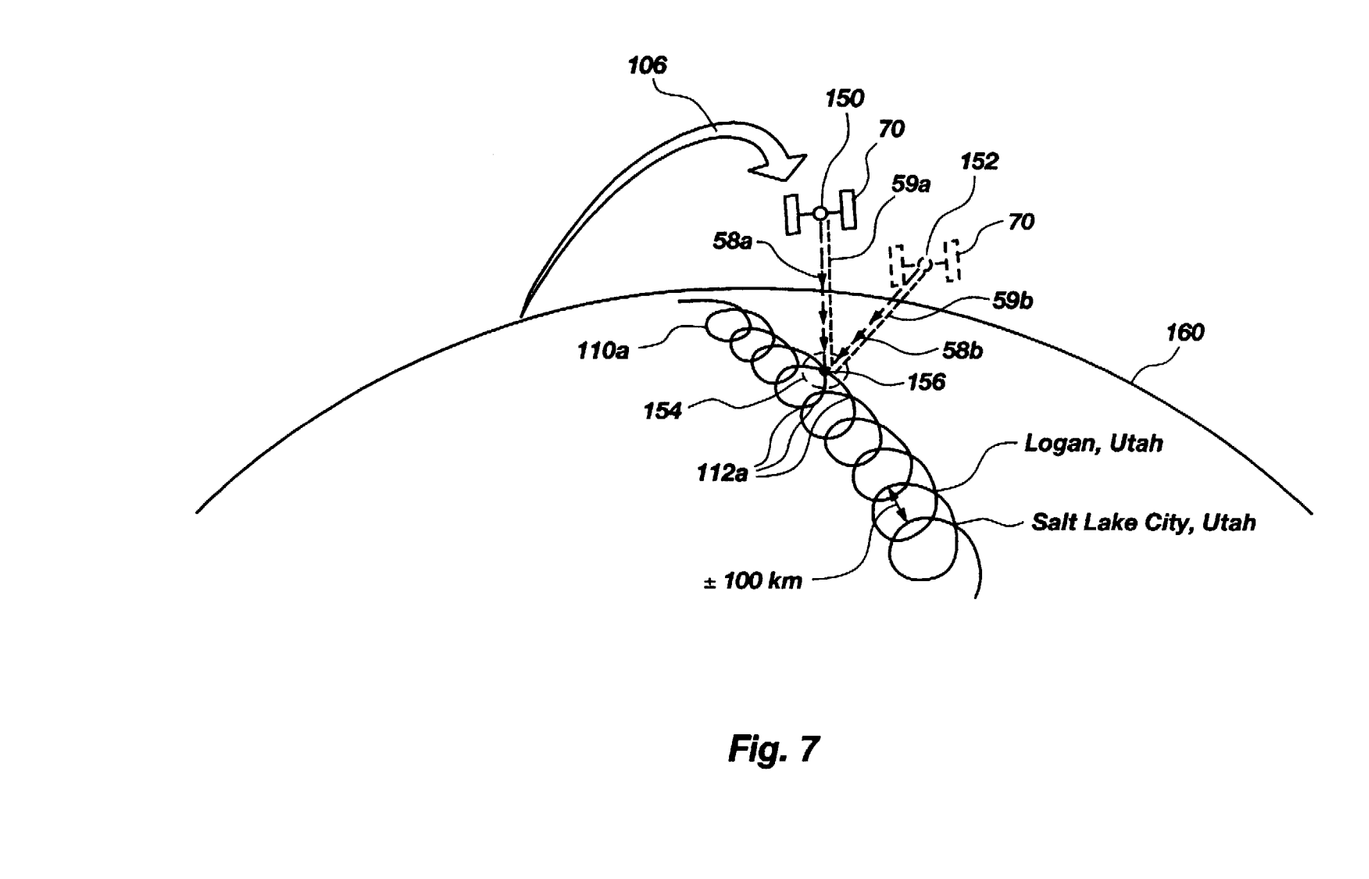
FIG. 7 is a diagram showing a partial sweep pattern of a satellite projecting laser pulses along a cycloid movement pattern.

Referring now to FIG. 7, it will be appreciated from the preceding disclosure that the simultaneous movements of the satellite 70 and the conical sweep of scanning beam 58 cooperate to cause the cycloid path 110 discussed in conjunction with FIG. 3, and depicted as path 110a in FIG. 7. The cross-over points discussed above are depicted in FIG. 7 at 112a. It is contemplated that the satellite 70 will travel at approximately eight kilometers per second, and that scanning beam 58a will comprise several beam pulses at a conical cycling speed to produce intersecting cycloid circles spaced at approximately 100 kilometers, such that outer crossover points 112a would also be spaced approximately 100 kilometers apart.

For example, if the satellite 70 travels over the United States and passes over Utah, one cross-over point might occur at or near Logan, Utah, and a following cross-over point might occur at or near Salt Lake City, Utah.

In accordance with the disclosure above, a preferred method for detecting and measuring wind velocity comprises the steps of:

(a) projecting a first laser beam 58a from a moving airborne vehicle 70 onto a first predetermined area 154 when the airborne vehicle 70 resides at a first airborne position 150;

(b) projecting a second laser beam 58b from a moving airborne vehicle 70 onto the first predetermined area 154 when the airborne vehicle 70 has moved to a second airborne position 152, wherein steps (a) and (b) further collectively comprise conically sweeping a plurality of laser beams about a three-dimensional, substantially conical path with respect to the airborne vehicle 70;

(c) receiving first and second backscattered laser light 59a and 59b originating from the first and second laser beams, respectively, which light has been backscattered from at least one object 156 moving within the first predetermined area 154;

(d) calculating Doppler shifts in the first and second backscattered light 59a and 59b and producing Doppler shift data therefrom representing components of Doppler shifting caused only by movement effects of the at least one object 156, and thus without movement effects of the airborne vehicle 70 or of the conical sweeping of the laser beams 58a and 58b; and (e) calculating from the Doppler shift data and from known angles of orientation of the first and second laser beams 58a and 58b, a velocity of the at least one object 156 in the form of a movement speed and a movement direction of said object, and thus wind velocity of wind carrying the at least one object 156;

wherein steps (a) and (b) further collectively comprise projecting a plurality of laser beams onto a two-dimensional, substantially cycloid pattern 110a with respect to earth 160;

wherein steps (a), (b) and (d) further collectively comprise altering frequency of the laser beams sufficiently to adjust for movement effects of both the airborne vehicle and the conical sweeping of the laser beams to thereby cause Doppler shifting in the backscattered light to be equivalent to Doppler shifting which would have occurred in the absence of movement of the airborne vehicle 70 and conical sweeping of the laser beams 58a and 58b;

wherein steps (a), (b) and (d) further collectively comprise altering electrical current within an injection diode 38 to thereby alter the frequency of the laser beams 58a and 58b;

wherein step (a) further comprises projecting the first laser beam from the first airborne position onto the at least one object when said object is traveling along a movement path such that said first laser beam is disposed in a substantially nonorthogonal orientation relative to said movement path of said object;

wherein step (b) further comprises projecting the second laser beam from the second airborne position onto the traveling object such that said second laser beam is disposed in a substantially nonorthogonal orientation relative to the movement path of the object.

As those skilled in the relevant physics will appreciate, the velocity vector comprises both the scalar quanty of speed as well as direction. Thus, the method could be described more broadly as a method for detecting and measuring wind speed, or as a method for detecting and measuring wind direction. It will also be appreciated that a key aspect of the invention subsists in determining Doppler shifting in the backscattered light 59a and 59b and producing Doppler shift data therefrom representing components of Doppler shifting caused only by movement effects of the at least one object 156, and thus without movement effects of the airborne vehicle 70 or of the conical sweeping of the laser beams 58a and 58b; and calculating from the Doppler shift data and from known angles of orientation of the first and second laser beams 58a and 58b, a velocity of the at least one object 156 in the form of a movement speed and a movement direction of said object.

This production of Doppler shift data may be achievable in various ways, all of which are within the scope of the present invention. The preferred method is to continuously tune and adjust the frequency of the projected laser beams 58a and 58b, responsive to known kinematics of the speed of the satellite 70 and of the conical sweeping movement of the beams 58 (and their angles of orientation) such that the absolute frequency of the backscattered light 59a and 59b represents a Doppler shift equivalent to what the shift would have been had the satellite and beam 58 been stationary.

This is much more effective than simply projecting a series of beams of the same (i.e. unaltered) frequency, calculating the Doppler shift and then correcting the Doppler shift data to eliminate the effects upon that shift of the satellite movement and conical sweeping movement of the beam. Instead, the preferred method is to alter the frequency of the beams 58a and 58b to begin with, such that the resulting frequency and Doppler shift in the backscattered light 59a and 59b are equivalent to what they would have been had the initial frequency been unaltered and had the satellite been stationary and beams not sweeping.

Those skilled in the relevant field will appreciate that many, many particles reside within area 154 which are carried by wind current. Many of those particles will be contacted by a single laser pulse 58a or 58b and contribute to the backscattered light 59a and 59b. It is assumed that these particles are carred by wind in essentially the same state of motion, within an acceptable range of accuracy.

Those skilled in the art will appreciate from the preceding disclosure that the objectives stated above are advantageously achieved by the present invention.

While the present invention is described in terms of lidar, it is to be understood that the subject apparatus and method may be used in any field of object speed and direction sensing application. Those having ordinary skill in the field of this invention will appreciate the advantages of the invention, and its application to a wide variety of lidar uses.

It is to be understood that the above-described arrangements are only illustrative of the application of the principles of the invention. Numerous modifications and alternative arrangements may be devised by those skilled in the art without departing from the spirit and scope of the present invention and the appended claims are intended to cover such modifications and arrangements.

What is claimed is:

1. A method for detecting and measuring wind speed, said method comprising the steps of:

(a) projecting a first laser beam from a moving airborne vehicle onto a first predetermined area when the airborne vehicle resides at a first airborne position;

(b) projecting a second laser beam from a moving airborne vehicle onto the first predetermined area when the airborne vehicle has moved to a second airborne position;

(c) receiving first and second backscattered laser light originating from the first and second laser beams, respectively, which light has been backscattered from at least one object moving within the first predetermined area;

(d) calculating Doppler shifts in the first and second backscattered light and producing Doppler shift data therefrom representing components of Doppler shifting caused only by movement effects of the at least one object, and thus without movement effects of the airborne vehicle; and (e) calculating from the Doppler shift data a movement speed of the at least one object, and thus wind speed of wind carrying the at least one object.

2. A method for detecting and measuring wind speed as defined in claim 1 and also for determining and measuring wind velocity, wherein step (e) further comprises determining a movement direction of the at least one object from the Doppler shift data and from known angles of orientation of the first and second laser beams.

3. The method as defined in claim 1, wherein steps (a) and (b) further collectively comprise projecting a plurality of laser beams onto a two-dimensional, substantially cycloid pattern with respect to earth.

4. The method as defined in claim 3, wherein steps (a) and (b) further collectively comprise conically sweeping a plurality of laser beams about a three-dimensional, substantially conical path with respect to the airborne vehicle.

5. The method as defined in claim 1, wherein steps (a), (b) and (d) further collectively comprise altering frequency of the laser beams responsive to movement of the airborne vehicle.

6. The method as defined in claim 5, wherein steps (a), (b) and (d) further collectively comprise altering electrical current within an injection diode to thereby alter the frequency of the laser beams.

7. The method as defined in claim 1, wherein step (a) further comprises projecting the first laser beam from the first airborne position onto the at least one object when said object is traveling along a movement path such that said first laser beam is disposed in a substantially nonorthogonal orientation relative to said movement path of said object.

8. The method as defined in claim 7, wherein step (b) further comprises projecting the second laser beam from the second airborne position onto the traveling object such that said second laser beam is disposed in a substantially non-orthogonal orientation relative to the movement path of the object.

9. The method as defined in claim 1, wherein step (a) further comprises projecting a plurality of first laser beams from a laser source while conically sweeping said laser source about a conical path with respect to the airborne vehicle, and wherein steps (d) and (e) further collectively comprise producing the Doppler shift data to represent components of Doppler shifting caused only by movement effects of the at least one object, and thus without movement effects of the conical sweeping of the laser source, and calculating from the Doppler shift data a movement speed of the at least one object.

10. The method as defined in claim 1, wherein step (a) further comprises projecting a plurality of first laser beams from a laser source while conically sweeping said laser beams about a conical path with respect to the airborne vehicle, and wherein steps (d) and (e) further collectively comprise producing the Doppler shift data to represent components of Doppler shifting caused only by movement effects of the at least one object, and thus without movement effects of the conical sweeping of the laser beams, and calculating from the Doppler shift data a movement speed of the at least one object.

11. The method as defined in claim 10, wherein steps (a) and (d) further collectively comprise altering frequency of the laser beams sufficiently to adjust for movement effects of both the airborne vehicle and the conical sweeping of the laser beams to thereby cause Doppler shifting in the backscattered light to be equivalent to Doppler shifting which would have occurred in the absence of movement of the airborne vehicle and conical sweeping of the laser beams.

12. The method as defined in claim 11, wherein step (d) further comprises altering electrical current within an injection diode to thereby alter the frequency of the laser beams.

13. A method for detecting and measuring wind direction, said method comprising the steps of:
   (a) projecting a first laser beam from a moving airborne vehicle onto a first predetermined area when the airborne vehicle resides at a first airborne position;
   (b) projecting a second laser beam from a moving airborne vehicle onto the first predetermined area when the airborne vehicle has moved to a second airborne position;
   (c) receiving first and second backscattered laser light originating from the first and second laser beams, respectively, which light has been backscattered from at least one object moving within the first predetermined area;
   (d) calculating Doppler shifts in the first and second backscattered light and producing Doppler shift data therefrom representing components of Doppler shifting caused only by movement effects of the at least one object, and thus without movement effects of the airborne vehicle; and
   (e) determining a movement direction of the at least one object from the Doppler shift data and from known angles of orientation of the first and second laser beams, and thereby determining wind direction of wind carrying the at least one object.

14. A method for detecting and measuring wind velocity, said method comprising the steps of:
   (a) projecting a first laser beam from a moving airborne vehicle onto a first predetermined area when the airborne vehicle resides at a first airborne position;
   (b) projecting a second laser beam from a moving airborne vehicle onto the first predetermined area when the airborne vehicle has moved to a second airborne position, wherein steps (a) and (b) further collectively comprise conically sweeping a plurality of laser beams about a three-dimensional, substantially conical path with respect to the airborne vehicle;
   (c) receiving first and second backscattered laser light originating from the first and second laser beams, respectively, which light has been backscattered from at least one object moving within the first predetermined area;
   (d) calculating Doppler shifts in the first and second backscattered light and producing Doppler shift data therefrom representing components of Doppler shifting caused only by movement effects of the at least one object, and thus without movement effects of the airborne vehicle or of the conical sweeping of the laser beams; and
   (e) calculating from the Doppler shift data and from known angles of orientation of the first and second laser beams, a velocity of the at least one object in the form of a movement speed and a movement direction of said object, and thus wind velocity of wind carrying the at least one object;
   wherein steps (a) and (b) further collectively comprise projecting a plurality of laser beams onto a two-dimensional, substantially cycloid pattern with respect to earth;
   wherein steps (a), (b) and (d) further collectively comprise altering frequency of the laser beams sufficiently to adjust for movement effects of both the airborne vehicle and the conical sweeping of the laser beams to thereby cause Doppler shifting in the backscattered light to be equivalent to Doppler shifting which would have occurred in the absence of movement of the airborne vehicle and conical sweeping of the laser beams;
   wherein steps (a), (b) and (d) further collectively comprise altering electrical current within an injection diode to thereby alter the frequency of the laser beams;
   wherein step (a) further comprises projecting the first laser beam from the first airborne position onto the at least one object when said object is traveling along a movement path such that said first laser beam is disposed in a substantially nonorthogonal orientation relative to said movement path of said object;
   wherein step (b) further comprises projecting the second laser beam from the second airborne position onto the traveling object such that said second laser beam is disposed in a substantially nonorthogonal orientation relative to the movement path of the object.

15. An apparatus for detecting and measuring wind speed from a moving airborne vehicle, said apparatus comprising:
   laser means for (i) projecting a first laser beam from the airborne vehicle onto a first predetermined area when the airborne vehicle resides at a first airborne position, and (ii) projecting a second laser beam from the airborne vehicle onto the first predetermined area when the airborne vehicle has moved to a second airborne position;
   receiving means attachable to the airborne vehicle for receiving first and second backscattered laser light originating from the first and second laser beams, respectively, which light has been backscattered toward said airborne vehicle from at least one object moving within the first predetermined area;
   data-producing means for calculating Doppler shifts in the first and second backscattered light and producing Doppler shift data therefrom representing components of Doppler shifting caused only by movement effects of the at least one object, and thus without movement effects of the airborne vehicle; and
   speed calculating means for calculating from the Doppler shift data a movement speed of the at least one object, and thus wind speed of wind carrying the at least one object.

16. An apparatus for detecting and measuring wind speed as defined in claim 15 and also for determining and measuring wind velocity, wherein the data-producing means and the speed calculating means collectively further comprise a means for determining a movement direction of the at least one object from the Doppler shift data and from known angles of orientation of the first and second laser beams.

17. The apparatus as defined in claim 15, wherein the laser means comprises guiding means for guiding a plurality of laser beam pulses onto a two-dimensional, substantially cycloid pattern with respect to earth.

18. The apparatus as defined in claim 17, wherein the laser means comprises a laser beam projector and wherein the guiding means comprises rotation means for conically sweeping the laser beam projector about a three-dimensional, substantially conical movement path with respect to the airborne vehicle.

19. The apparatus as defined in claim 17, wherein the laser means comprises means for conically sweeping a plurality of laser beams about a three-dimensional, substantially conical path with respect to the airborne vehicle.

20. The apparatus as defined in claim 15, wherein the data-producing means further comprises:
   means for producing control signals corresponding to movement of the airborne vehicle; and
   tuning means for altering frequency of the laser beams projected by the laser means responsive to the control signals.

21. The apparatus as defined in claim 20, wherein the tuning means comprises:
   an injection diode driven by electrical current; and
   means for altering the electrical current.

22. The apparatus as defined in claim 15, wherein the laser means further comprises a plurality of alexandrite rods.

23. The apparatus as defined in claim 15, wherein the laser means further comprises a rotational holographic optical element having optical properties which produce a deflection angle in a laser beam passing therethrough.

24. A lidar comprising:
   at least one transmitter means for generating at least one laser beam of electromagnetic radiation and then selectively emitting said at least one laser beam;
   tuning means for selectively varying at least one frequency of the at least one laser beam before emitting said at least one laser beam;
   scanning means for sweeping the at least one laser beam along a selectively variable path such that the at least one laser beam strikes objects in the atmosphere and creates backscatter; and
   receiving means for detecting said backscatter from the objects in the atmosphere so as to determine a Doppler shift of the at least one laser beam.

25. A method of using lidar, comprising the steps of:
   (a) transmitting at least one laser beam of electromagnetic radiation;
   (b) bending said at least one beam by passing said beam through a holographic optical element;
   (c) rotating said holographic optical element to selectively vary the direction of said at least one beam such that said beam strikes objects in the atmosphere and creates backscatter;
   (d) detecting said backscatter from the objects in the atmosphere with a receiver so as to determine a Doppler shift of the at least one beam.

* * * * *